(12) United States Patent
Moskob

(10) Patent No.: US 6,453,772 B1
(45) Date of Patent: Sep. 24, 2002

(54) ECCENTRIC TOOTHED GEARING

(75) Inventor: Frank Moskob, Buhlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,858

(22) PCT Filed: Jul. 2, 1999

(86) PCT No.: PCT/DE99/02048
§ 371 (c)(1),
(2), (4) Date: Sep. 5, 2000

(87) PCT Pub. No.: WO00/28238
PCT Pub. Date: May 18, 2000

(30) Foreign Application Priority Data

Nov. 5, 1998 (DE) .......................... 198 50 908

(51) Int. Cl.[7] .............................................. F16H 49/00
(52) U.S. Cl. .......................................... 74/640; 475/162
(58) Field of Search ...................... 74/640; 475/162, 475/179

(56) References Cited

U.S. PATENT DOCUMENTS

| | | | |
|---|---|---|---|
| 1,645,510 A | | 10/1927 | Wood |
| 2,380,776 A | | 7/1945 | Miller |
| 4,027,541 A | * | 6/1977 | Nishioka ................ 475/162 |
| 4,619,156 A | * | 10/1986 | Kiryu ...................... 74/640 |
| 5,080,638 A | * | 1/1992 | Osborn .................. 475/162 |
| 5,876,298 A | * | 3/1999 | Kato et al. ............. 475/162 |
| 6,280,359 B1 | * | 8/2001 | Moskob .................. 475/162 |

FOREIGN PATENT DOCUMENTS

| | | |
|---|---|---|
| DE | 91 16 261 U | 10/1992 |
| DE | 41 27 051 A | 2/1993 |
| EP | 0 840 037 | 5/1998 |
| FR | 2 641 351 A | 7/1990 |

* cited by examiner

*Primary Examiner*—Sherry Estremsky
(74) *Attorney, Agent, or Firm*—Michael J. Striker

(57) ABSTRACT

An eccentric gear transmission, having a rotary drive unit (3) with an eccentric element (8), an eccentric wheel (10) supported rotatably thereon with a set of teeth (11), which cooperates by intermittent meshing with a set of teeth (14) of a driver (15), and furthermore the eccentric wheel (10) has guide elements (12a; 18, 19), which are guided in a stationary housing part (6) directly or indirectly in receptacles (106, 108). It is proposed that the housing part (6) be embodied in one piece, with the receptacles (106, 108) disposed vibratably in the housing part.

13 Claims, 3 Drawing Sheets

ECCENTRIC TOOTHED GEARING

PRIOR ART

The invention relates to an eccentric gear transmission for stepping up the rotary motion of adjusting motors.

For reducing the rpm of adjusting motors, in which the rotary speed of the armature is approximately 7000 rpm, worm gears are as a rule employed. These worm gears, which are driven by electric motors, are distinguished by having self-inhibition from the power takeoff side. Because of the high step-up ratio required to achieve adequate torques, for instance for a power window or power sunroof drive unit in a motor vehicle, the external dimensions of an adjusting motor comprising a motor and side-by-side gears are considerable.

ADVANTAGES OF THE INVENTION

The eccentric gear transmission of the invention having the characteristics of the main claim has the advantage of very compact dimensions yet it has self-inhibition and a simple design. Compared with the known worm gears, the eccentric gear transmission is comparatively free of tolerance problems, since all the rotating parts are disposed on one shaft.

An essential component of the eccentric gear transmission is an eccentric wheel, which by its construction can execute two different motions. One of these is rolling along a set of external teeth of a driver, which leads to a circular motion about a pivot point that is eccentric to the axis of the eccentric wheel ("swash motion"), and the other is a rotation about itself. The rotation about itself is undesired and is prevented by guide elements on the eccentric wheel that protrude into corresponding receptacles of a housing part solidly joined to the housing.

The circular motion of the eccentric wheel can be split into two linear motions perpendicular to one another. In the transmission of the invention, these two linear motion components are absorbed by a single part, while in conventional versions they are absorbed by two separate parts. Because of the one-piece embodiment of the housing part that absorbs the circular motions of the eccentric wheel, production costs on the one hand and the effort and expense of assembly on the other are reduced. Both effects are advantageous.

The particular advantage of the one-piece version of the housing part and the vibratable disposition of the receptacles is that the interaction between the guide elements of the eccentric wheel and the receptacles of the housing part takes place entirely without friction and thus without wear. This guarantees a correspondingly long expected life of the eccentric gear transmission of the invention.

Advantageous refinements of the eccentric gear transmission defined by the main claim are possible with the characteristics recited in the dependent claims.

For instance, the housing part is advantageously made up of three regions joined together and has an inner region with receptacles, a middle region, and an outer region joined solidly to the housing; the inner region and the middle region are disposed vibratably relative to the outer region. The cooperation of the guide elements, mounted on the eccentric wheel, with the receptacles on the inner region of the housing part brings about the advantageous guidance of the eccentric wheel.

As a result of joining the inner region to the middle region and the middle region to the outer region via deformable regions, the advantage is obtained that the circular motion of the eccentric wheel about a center position, which is required for operating the eccentric gear transmission, remains assured.

The advantage of the one-piece design mentioned at the outset is obtained structurally by embodying the deformable regions by means of recesses. Thus the complete housing part can be produced in a suitable shape as a single part by injection molding.

An elongated extension of the deformable regions is advantageous because then, with minimal stress on the material, the requisite deformation or deflection of the deformable regions remains assured.

If the deformable regions between the inner region and the middle region and the deformable regions between the middle region and the outer region are disposed crosswise to one another, the advantage is obtained that the circular motion of the eccentric wheel is separated exactly into the two linear components, perpendicular to one another, of this motion. The resultant forces are thus distributed uniformly to the housing part and to the deformable regions.

By narrowed portions on the ends of the deformable regions, their elasticity or spring-constants can be adjusted to suit existing requirements.

In a further advantageous version of the invention, the housing part is made up of only two regions joined together, and it has an inner region and an outer region that is solidly joined to the housing; in this case, the inner region is vibratable relative to the outer region, and the receptacles are vibratable relative to the inner region.

By joining the inner region to the outer region and by joining the receptacles to the inner region via deformable regions, the advantage is obtained, precisely as in the first variant, that the circular motion of the eccentric wheel about a center position, which is required for the operation of an eccentric gear transmission, remains assured.

It is especially advantageous in this respect that all of the deformable regions are of equal length and are equally far away from the center point and are thus exposed to an equal stress.

The formation of the deformable regions by recesses, the elongated extension, and the disposition of the deformable regions that joined to the receptacles crosswise to the regions that are not joined to the receptacles all produce the aforementioned advantages.

DRAWING

Two exemplary embodiments of an apparatus according to the invention are shown in the drawing and described in further detail below.

DESCRIPTION OF THE EXEMPLARY EMBODIMENTS

Figure 1:
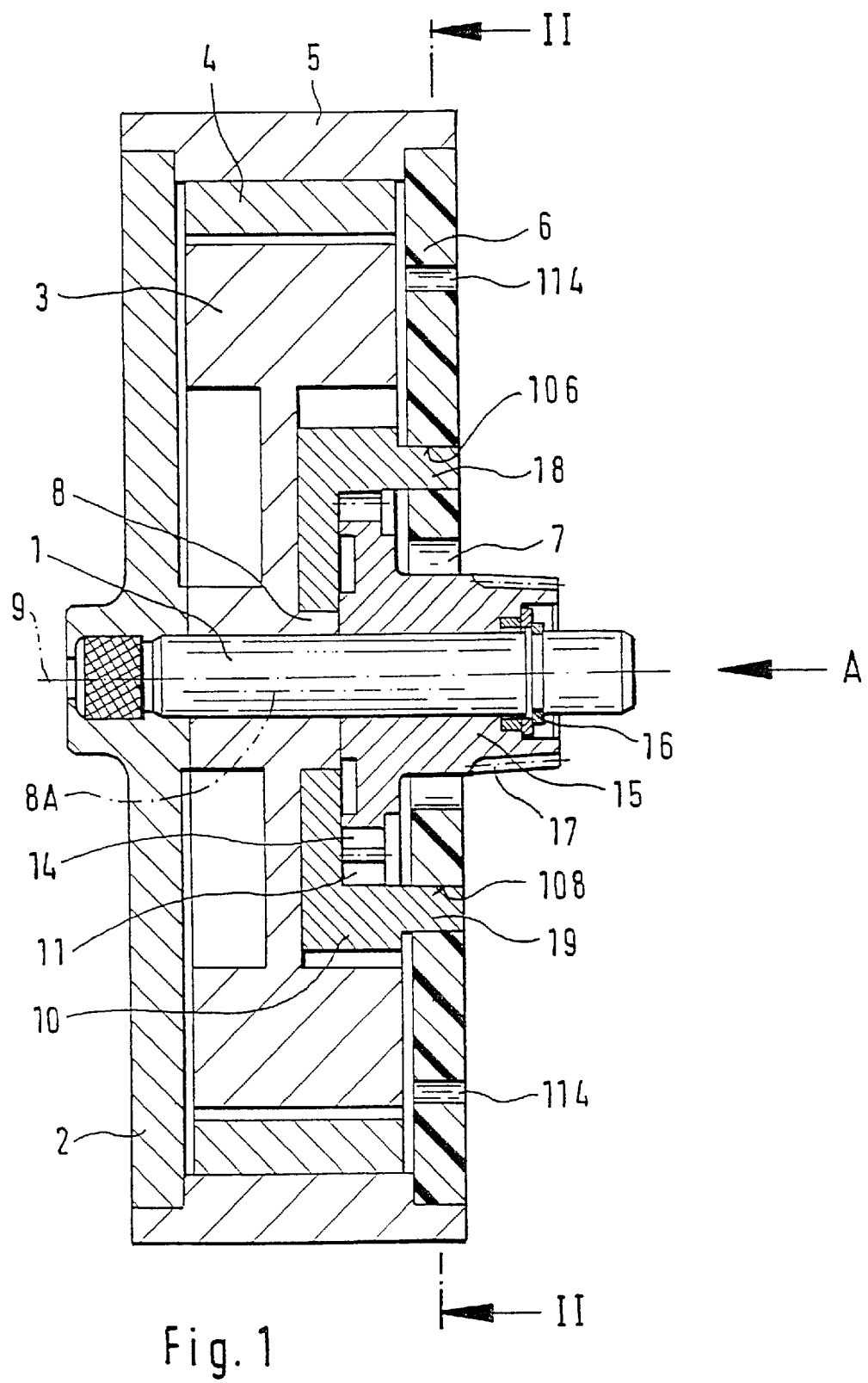
FIG. 1 shows a longitudinal section through an eccentric gear transmission.

The exemplary embodiment shown in FIG. 1 has an electric motor with an eccentric gear transmission having a shaft 1, which is secured in a housing bottom 2 in a manner fixed against relative rotation. A drive means in the form of an armature 3 is rotatably disposed on the shaft 1 and is driven by coils 4 of the electric motor. The coils are disposed on the inside in a cylindrical housing portion 5, and the housing bottom 2 is also secured to the housing portion 5. A housing part 6 in the form of a cap with a central opening 7 is solidly mounted on the side of the housing portion 5 opposite the housing bottom 2. The end of the shaft 1 remote from the housing bottom 2 protrudes through this central opening 7. The housing portion 5, housing bottom 2 and cap 6 form a motor housing in whose interior the armature 3 that is rotatable on the shaft 1 is disposed, and the eccentric element 8 extending axially along the center axis 9 is provided with its eccentric element axis 8A. An eccentric wheel 10 is rotatably supported on the eccentric element 8 and is provided with a set of internal teeth 11. Two guide elements in the form of two pegs 18, 19 are secured parallel to the shaft 1 on the eccentric wheel 10; they protrude into two receptacles 106 and 108 in the housing part 6 and are fixed therein.

The internal teeth 11 of the eccentric wheel 10 mesh intermittently with a set of external teeth 14 of a driver 15 that is supported rotatably on the shaft 1 and secured axially by fastening means 16. The driver 15 protrudes through the housing part 6 to emerge from the motor housing and is provided in this region with a further set of external teeth 17 for the transmission output.

Figure 2:
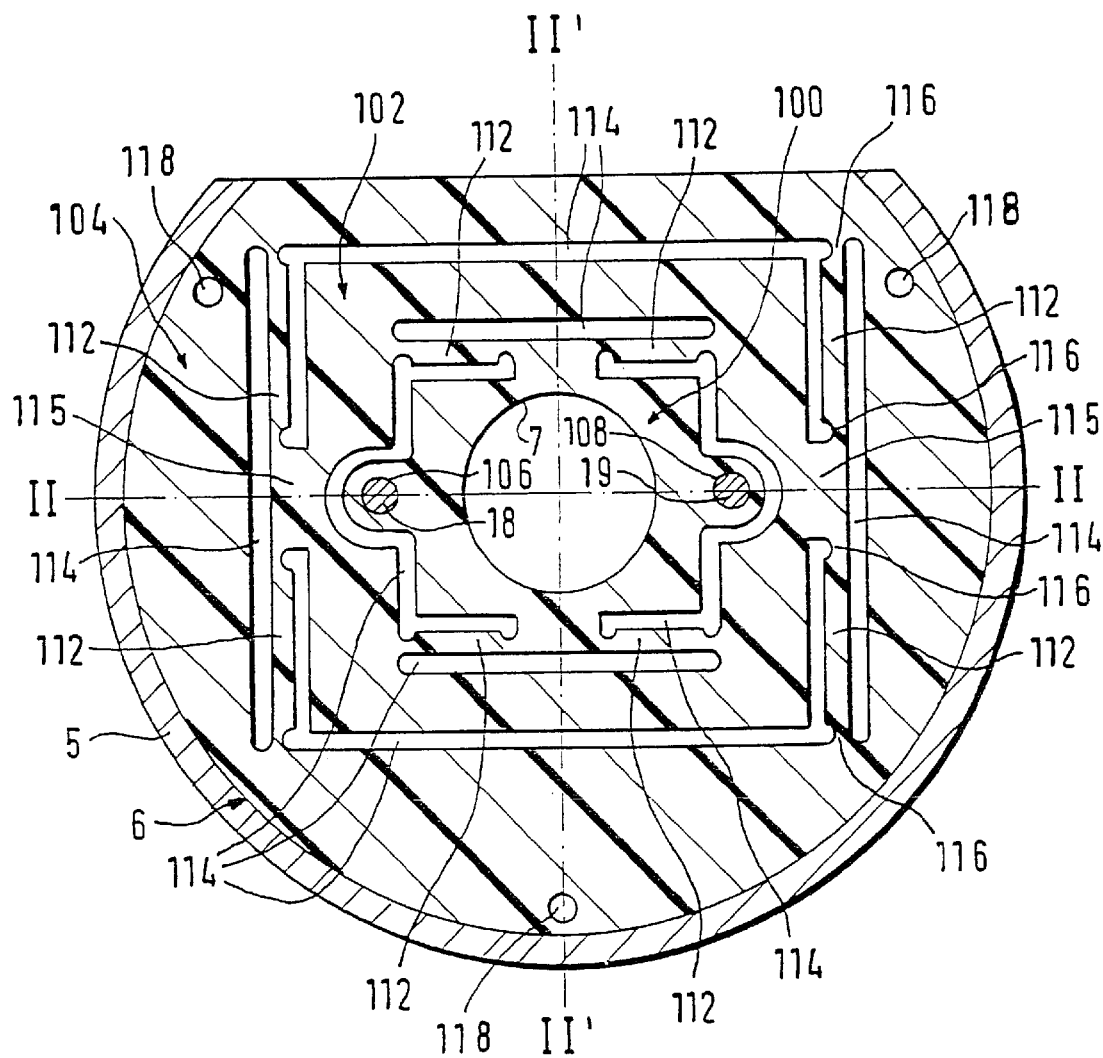
FIG. 2 shows a plan view taken along the line II—II of FIG. 1 in the direction of the arrow A.

In FIG. 2, the housing part 6 is shown in plan view; it comprises an inner region 100, a middle region 102, and an outer region 104 joined solidly to the housing portion 5. This housing part 6 is the guide element for the eccentric wheel 10. It is injection molded in one piece of an elastic material, such as plastic. In its inner region 100, it has receiving bores 106, 108 for the two pegs 18, 19. The central opening 7 is also disposed on the inner region 100, through which the end of the shaft 1 remote from the housing bottom 2 protrudes. The three regions of the housing part 6 are joined integrally to one another via deformable regions 112.

For the sake of better comprehension, the mode of operation of an eccentric gear transmission will be described briefly again here. By means of the magnetic field induced in the coils 4, the armature 3 rotates about the shaft 1, which is joined to the housing bottom 2 in a manner secured against relative rotation. Because of the rotation of the armature 3, the eccentric element 8 also rotates about the shaft 1.

The eccentric wheel 10, supported rotatably on the eccentric element 8, would roll with its internal teeth 11 along the external teeth 14 of the driver 15, but because of the pegs 18, 19 guided in the receptacles 106, 108—it cannot itself execute any rotation about itself, so that the driver 15, also joined rotatably to the shaft 1, rolls with its teeth 14 along the internal teeth 11. Because of this rolling of the driver 15 in the eccentric wheel 10, the rotary motion of the driver 15 is stepped down, and this stepped-down rotary motion is carried onward via the external teeth 17 of the driver 15.

The eccentric wheel 10 consequently executes a circular motion, leading to a circular motion of the two pegs 18, 19 that the housing part 6 has to allow.

This motion can be split into two radial motions perpendicular to one another. It is made possible by the deformable regions 112 and effects the deflection of the housing part that contains the receptacles 106, 108.

The deformable regions 112 are struts, which are formed on both sides by recesses 114 that are disposed between the regions 100, 102 and 104 to be joined. In FIG. 2, the recesses 114 have different geometries; the mirror symmetry along the two axes II—II and II'—II', which are perpendicular to one another, is decisive. It is also important that the width of the recesses 114 be selected to be at least great enough that the deflections of the deformable regions 112 by the eccentric motion can be received therein, so that the regions 112 are not hindered in their motion.

By the formation of the recesses 114 in the manner shown in FIG. 2, the deformable regions 112 between the inner region 100 and the middle region 102 and the deformable regions 112 between the middle region 102 and the outer region 104 are disposed crosswise, or in other words at an angle of 90,° to one another. This arrangement represents an ideal geometry for absorbing the eccentric motion of the eccentric wheel 10.

Figure 3:
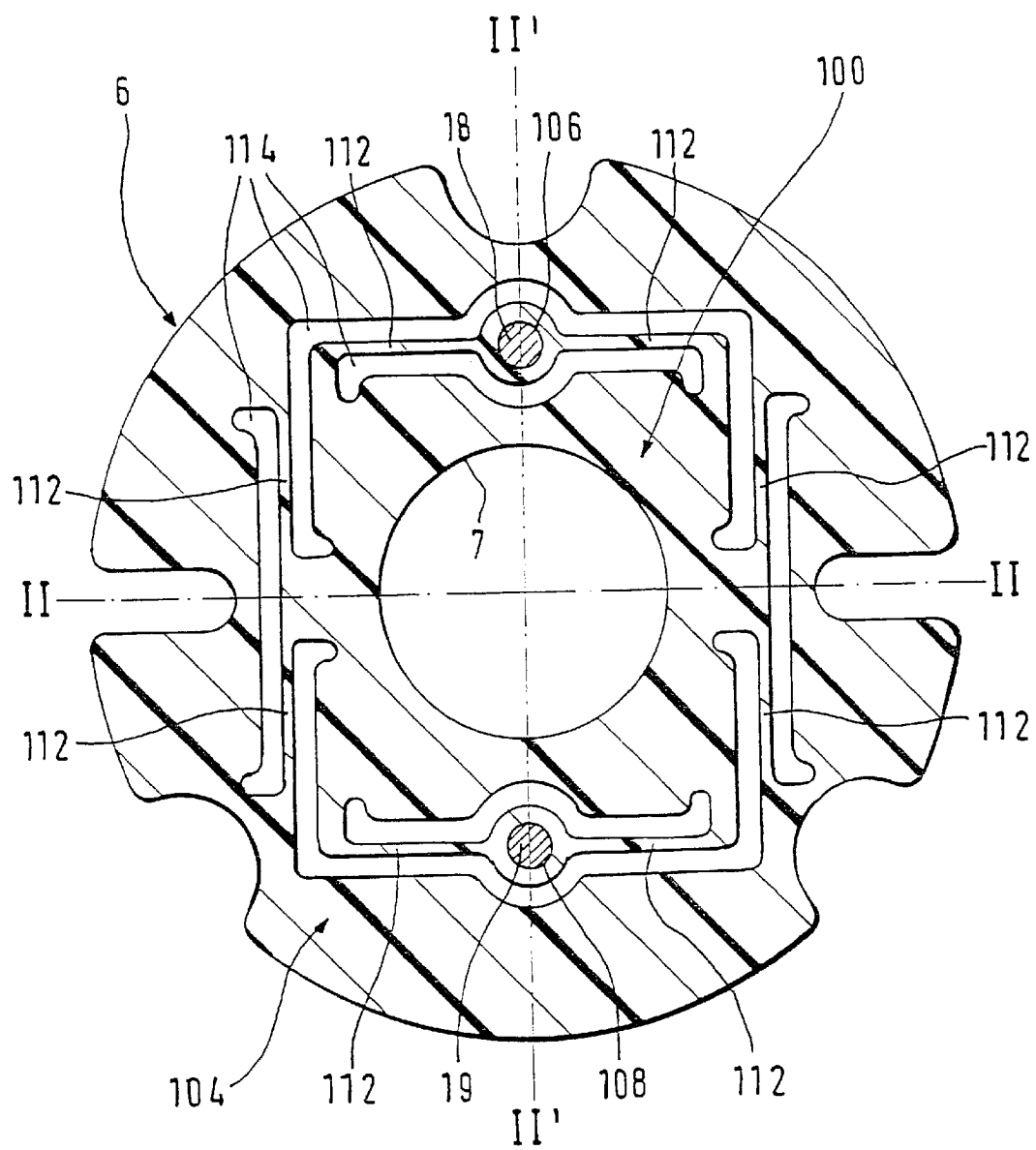
FIG. 3 shows a second exemplary embodiment in a view analogous to FIG. 2.

In FIG. 3, the housing part 6 of a second exemplary embodiment is shown; identical characteristics are provided with the same reference numerals as in FIG. 2.

The deformable strutlike regions 112 in FIG. 3 are again formed by recesses 114 on both sides that are disposed between the regions 100 and 104 to be joined. In a distinction from the first exemplary embodiment, the second exemplary embodiment has only two subregions 100, 104, and the two receptacles 106, 108 opposite one another are disposed vibratably not on the inner region 100 but rather on the inner region via deformable, beamlike regions 112. This arrangement is crosswise to the deformable regions 112 that join the inner region 100 to the outer region 104. Thus here as well, an exact separation of the circular motion of the eccentric wheel 10 and guidance of it that is advantageous according to the invention are achieved.

With regard to the geometry, it is true of the second exemplary embodiment as well that the paired symmetrical arrangement of the struts defined by the recesses 114 is of decisive importance. The width of the recesses 114 must also be selected as great enough to suit the deflections.

Because of the formation of the recesses 114 as described above, the deformable regions 112 between the inner region 100 and the outer region 104 and the deformable regions 112 between the inner region 100 and receptacles 106, 108 are disposed crosswise to one another. This arrangement represents an ideal geometry for absorbing the eccentric motion of the eccentric wheel 10.

The two exemplary embodiments of FIGS. 2 and 3 shown can be produced very simply by an injection molding process; the deformable regions 112 can also be provided with inlaid metal parts to increase the strength.

In principle, still other geometries of the recesses 114 are conceivable, for instance leading to deformable regions 112 in the form of an accordion. Regardless of the exemplary embodiments presented, it is important that the subsystems 100, 102, 104 are resistant to relative rotation, and the deformable regions 112 are designed such that they can follow along with the cyclical motion of the eccentric wheel 10.

What is claimed is:

1. An eccentric gear transmission, having a rotary drive unit (3) with an eccentric element (8), an eccentric wheel (10) supported rotatably thereon with a set of teeth (11), which cooperates by intermittent meshing with a set of teeth (14) of a driver (15), and furthermore the eccentric wheel (10) has guide elements (12a; 18, 19), which are guided in a stationary housing part (6) directly or indirectly in receptacles (106, 108) of the housing part (6), characterized in that the housing part (6) is embodied in one piece, and the receptacles (106, 108) are formed vibratably in the housing part.

2. The apparatus of claim 1, characterize in that the housing part has an inner region (100), a middle region (102), and an outer region (104) joined solidly to the rest of the housing, wherein the inner region (100) and the middle region (102) are disposed vibratably relative to the outer region (104) about axes that are perpendicular to one another.

3. The apparatus of claim 2, characterized in that the inner region (100) is joined to the middle region (102), and the middle region (102) is joined to the outer region (104), via deformable regions (112).

4. The apparatus of claim 3, characterized in that the deformable regions (112) are formed by recesses (114), which are disposed between the inner region (100) and the middle region (102), and between the middle region (102) and the outer region (104).

5. The apparatus of claim 3, characterized in that the deformable regions (112) have an elongated extension, preferably embodied in beamlike form by recesses (114) disposed on both sides.

6. The apparatus of claim 3, characterized in that the deformable regions (112) between the inner region (100) and the middle region (102) and the deformable regions (112) between the middle region (102) and the outer region (104) are disposed crosswise to one another.

7. The apparatus of claim 3, characterized in that the ends of deformable regions (112) have narrowed portions (116).

8. The apparatus of claim 1, characterized in that the housing part has an inner region (100) having the receptacles (106, 108), and an outer region (104) that is joined solidly to the rest of the housing, wherein the inner region (100) is disposed as vibratable relative to the outer region (104), and the receptacles (106, 108) are disposed vibratably relative to the inner region (100), about axes that are perpendicular to one another.

9. The apparatus of claim 8, characterized in that the inner region (100) is joined to the outer region (104), and the receptacles (106, 108) are joined to the inner region (100), via deformable regions (112).

10. The apparatus of claim 9, characterized in that the deformable regions (112) are formed by recesses (114) which are disposed between the inner region (100) and the outer region (104).

11. The apparatus of claim 9, characterized in that the deformable regions (112) have an elongated extension, are preferably embodied in beamlike form, and are bounded on both sides by recesses (114).

12. The apparatus of claim 9, characterized in that the deformable regions (112) joined to the receptacles (106, 108), and the deformable regions (112) not joined to the receptacles (106, 108), are disposed crosswise to one another.

13. The apparatus of claim 9, characterized in that the ends of the deformable regions (112) have narrowed portions (116).

* * * * *